United States Patent [19]
Sousa et al.

[11] Patent Number: 5,822,345
[45] Date of Patent: Oct. 13, 1998

[54] DIODE-PUMPED LASER SYSTEM AND METHOD

[75] Inventors: John G. Sousa, Hudson; Josh Foster, Nashua; Wayne Mueller, Londonderry, all of N.H.

[73] Assignee: Presstek, Inc., Hudson, N.H.

[21] Appl. No.: 676,470

[22] Filed: Jul. 8, 1996

[51] Int. Cl.$^6$ .................................................. H01S 3/10
[52] U.S. Cl. ............................. 372/38; 372/25; 372/41; 372/75
[58] Field of Search ................................ 372/9, 25, 30, 372/33, 34, 36, 38, 39, 41, 75, 6

[56] References Cited

U.S. PATENT DOCUMENTS

| | | | |
|---|---|---|---|
| 3,920,951 | 11/1975 | Chovan et al. | 219/121.6 |
| 4,653,056 | 3/1987 | Baer et al. | 372/27 |
| 4,656,635 | 4/1987 | Baer et al. | 372/27 |
| 4,665,529 | 5/1987 | Baer et al. | 372/107 |
| 4,710,940 | 12/1987 | Sipes, J. | 372/75 |
| 4,739,507 | 4/1988 | Byer et al. | 372/22 |
| 4,791,631 | 12/1988 | Baumert et al. | 372/22 |
| 4,809,291 | 2/1989 | Byer et al. | 372/75 |
| 4,847,851 | 7/1989 | Dixon | 372/75 |
| 4,872,177 | 10/1989 | Baer et al. | 372/75 |
| 4,910,737 | 3/1990 | Payne et al. | 372/6 |
| 4,942,582 | 7/1990 | Kintz et al. | 372/18 |
| 4,955,725 | 9/1990 | Johnson et al. | 372/22 |
| 5,058,118 | 10/1991 | Qui et al. | 372/21 |
| 5,127,068 | 6/1992 | Baer et al. | 385/34 |
| 5,130,996 | 7/1992 | Amano et al. | 372/21 |
| 5,197,072 | 3/1993 | Harada et al. | 372/21 |
| 5,216,681 | 6/1993 | St. Pierre et al. | 372/22 |
| 5,222,088 | 6/1993 | Amano | 372/22 |
| 5,245,618 | 9/1993 | Masuda et al. | 372/22 |
| 5,278,851 | 1/1994 | Goto | 372/19 |
| 5,291,505 | 3/1994 | Nielsen | 372/38 |
| 5,303,250 | 4/1994 | Masuda et al. | 372/38 |
| 5,331,650 | 7/1994 | Maeda et al. | 372/26 |
| 5,410,559 | 4/1995 | Nighan, Jr. et al. | 372/19 |
| 5,561,547 | 10/1996 | Keirstead et al. | 372/34 X |

OTHER PUBLICATIONS

Mingxin et al., *Applied Optics*, 32:2085–2086 (Apr. 1993).
Zayhowski et al., *Optic Letters*, 14:1318–1320 (Dec. 1989).
Zayhowski, *Optic Letters*, 16:575–577 (Apr. 1991).
Zayhowski et al., *Optic Letters*, 17:1201–1203 (Sep. 1992).
Fan, *IEEE Journal of Quantum Electronics*, 28:2692–2697 (Dec. 1992).
Mizell et al., "Recent Developments in the Growth, Processing, and Testing of Rare Earth Doped YV04 Single Crystals" (No Journal Name or Date).
MacKinnon et al., *Optics Communications 94*, 94:281–288 (Nov. 1992).
Lacovara et al., *Optics Letters*, 16:1089–1091 (Jul. 1991).

(List continued on next page.)

*Primary Examiner*—John D. Lee
*Attorney, Agent, or Firm*—Cesari & McKenna, LLP

[57] ABSTRACT

A laser system for imaging graphic-arts constructions avoids the need to demagnify a divergent beam by using the output of a semiconductor or diode laser to optically pump a laser crystal, which itself emits laser radiation with substantially less beam divergence. A preferred implementation utilizes, as a pumping source, at least one laser device that emits in the IR, and preferably near-IR region, to image ablative or transfer-type printing members. The output of the pumping source is provided to the laser crystal via a focusing lens arrangement. The output of the laser crystal, in turn, is focused onto the surface of a recording medium to perform the imaging function. Crystal excitation and decay times are minimized by continuously maintaining the pumping source at a bias power level, which keeps the crystal at a continuous, baseline power level just short of lasing or imaging; and then selectively and intermittently increasing power to the pumping source to cause the crystal to lase (or lase at higher power) in an imagewise pattern. By selectively varying the pulse width within certain limits, it is possible to obtain image dots of different sizes while retaining a round dot shape.

27 Claims, 9 Drawing Sheets

OTHER PUBLICATIONS

Chen et al., *Optics Letters*, 18:1418–1419 (Sep. 1993).
Zhou et al., *Optics Letters*, 18:511–512 (Apr. 1993).
Li et al., *Optics Letters*, 18:203–204 (Feb. 1993).
"Laser Characteristics of YV04" (No Name, Journal, or Date).
"Yttrium Orthovanadate (YV04)" (No Name, Journal, or Date).

Fan, IEEE Journal of Quantum Electronics, 29:1457–1459 (Jun. 1992).

Zayhowski et al., Optic Letters, 19:1427–1429 (Sep. 1994).

Taira et al., *Optics Letters*, 16:1955–1957 (Dec. 1991).

Robrish, *Optics Letters*, 19:813–815 (Jun. 1994).

Longhi, *J. Opt. Soc. Am B.*, 11:1098–1107 (Jun. 1994).

DIODE-PUMPED LASER SYSTEM AND METHOD

BACKGROUND OF THE INVENTION

1. Field of the Invention

The present invention relates to digital printing apparatus and methods, and more particularly to a system for imaging lithographic printing members on- or off-press using digitally controlled laser output.

2. Description of the Related Art

In offset lithography, a printable image is present on a printing member as a pattern of ink-accepting (oleophilic) and ink-repellent (oleophobic) surface areas. Once applied to these areas, ink can be efficiently transferred to a recording medium in the imagewise pattern with substantial fidelity. Dry printing systems utilize printing members whose ink-repellent portions are sufficiently phobic to ink as to permit its direct application. Ink applied uniformly to the printing member is transferred to the recording medium only in the imagewise pattern. Typically, the printing member first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing member corresponding to each color is required. The original image is decomposed into a series of imagewise patterns, or "separations," that each reflect the contribution of the corresponding printable color. The positions of the printing members are coordinated so that the color components printed by the different members will be in register on the printed copies. Each printing member ordinarily is mounted on (or integral with) a "plate" cylinder, and the set of cylinders associated with a particular color on a press is usually referred to as a printing station.

In most conventional presses, the printing stations are arranged in a straight or "in-line" configuration. Each such station typically includes an impression cylinder, a blanket cylinder, a plate cylinder and the necessary ink (and, in wet systems, dampening) assemblies. The recording material is transferred among the print stations sequentially, each station applying a different ink color to the material to produce a composite multi-color image. Another configuration, described in U.S. Pat. No. 4,936,211, relies on a central impression cylinder that carries a sheet of recording material past each print station, eliminating the need for mechanical transfer of the medium to each print station. With either type of press, the recording medium can be supplied to the print stations in the form of cut sheets or a continuous "web" of material.

To circumvent the cumbersome photographic development, plate-mounting and plate-registration operations that typify traditional printing technologies, practitioners have developed electronic alternatives that store the imagewise pattern in digital form and impress the pattern directly onto the plate. Plate-imaging devices amenable to computer control include various forms of lasers. For example, U.S. Pat. Nos. 5,351,617 and 5,385,092 disclose an ablative recording system that uses low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer). Other systems use laser energy to cause transfer of material from a donor to an acceptor sheet, to record non-ablatively, or as a pointwise alternative to overall exposure through a photomask or negative.

As discussed in the '617 and '092 patents, laser output can be generated remotely and brought to the recording blank by means of optical fibers and focusing lens assemblies. It is important, when focusing radiation onto the recording blank, to maintain satisfactory depth-of-focus—that is, the tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that accompany normal use. Depth-of-focus is maximized by keeping output beam divergence to a minimum.

Unfortunately, optical efforts to reduce beam divergence also diminish power density, since a lens cannot alter the brightness of the radiation it corrects; a lens can only change the optical path. Thus, optical correction presents an inherent tradeoff between depth-of-focus and power loss.

DESCRIPTION OF THE INVENTION

Brief Summary of the Invention

The present invention facilitates reduction of beam divergence without the loss of brightness, and therefore power density, that results from optical correction. In particular, the divergent output of a semiconductor or diode laser is not used directly, but instead optically pumps a laser crystal, which itself emits laser radiation with substantially less beam divergence but equivalent power density; the laser crystal converts divergent incoming radiation into a single-mode output with higher brightness. Although the preferred implementation of the invention involves laser imaging of lithographic printing members, it is usefully applied to a wide variety of laser-recording systems involving various different kinds of graphic-arts constructions.

The preferred implementation utilizes, as a pumping source, at least one laser device that emits in the IR, and preferably near-IR region, to image ablative printing members (as disclosed, for example, in the '617 and '092 patents, as well as in U.S. Pat. Nos. 5,339,737 and 5,379,698); or transfer-type printing members (as disclosed, for example, in U.S. Ser. No. 08/376,766, filed on Jan. 23, 1995 and entitled METHOD AND APPARATUS FOR LASER IMAGING OF LITHOGRAPHIC PRINTING MEMBERS BY THERMAL NON-ABLATIVE DISCHARGE). The pumping lasers are typically solid-state devices (commonly termed semiconductor lasers and typically based on gallium aluminum arsenide or gallium aluminum indium compounds); these are distinctly economical and convenient, and may be used in conjunction with a variety of recording media. The use of near-IR radiation facilitates use of a wide range of organic and inorganic absorption compounds and, in particular, semiconductive and conductive types.

In accordance with the invention, the output of the pumping source is provided to the laser crystal via a focusing lens arrangement. The output of the laser crystal, in turn, is focused onto the surface of a recording medium to perform the imaging function. In ablation-type systems, the beam is focused on the "ablation layer" of the recording material, which is designed to volatilize in response to laser radiation; again, the depth-of-focus of the laser beam provides a degree of tolerable deviation. In transfer-type systems, the beam is focused on the transfer layer. As used herein, the term "plate" or "member" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

A substantial impediment to the use of laser crystals in commercial imaging systems is their relatively gradual excitation and decay times. Practical imaging equipment requires lasers that respond nearly instantaneously to high-frequency square-wave power pulses so that imaging dots appear as sharp, discrete, and ordinarily round shapes. Dots must also be printed, or recording space left blank, at very closely spaced intervals to achieve typical print resolutions. Excitation and decay times, however, shorten the duration of peak power levels in an imaging pulse; and because these pulses are quite short in commercial imaging systems, it may be difficult to deliver, during a single pulse, sufficient overall energy to produce an image dot. Moreover, the failure of the laser equipment to undergo sudden transitions between lasing and non-lasing states results in misshapen dots that will not be placed properly on the recording medium: during the imaging process the medium and the laser ordinarily undergo relative movement, so delays between a power pulse and laser output result in translational offsets between target and actual dot locations.

It has been found, however, that this undesirable response characteristic can be substantially overcome by continuously maintaining the pumping source at a bias power level, which keeps the crystal at a continuous, baseline power level just short of lasing or imaging; and then selectively and intermittently increasing power to the pumping source to cause the crystal to lase (or lase at higher power) in an imagewise pattern. The result is a very sharp crystal response that follows the selective power increases—that is, imaging pulses—very closely in terms of response profiles. The crystal and pumping source are chosen such that the baseline power level is insufficient to cause imaging of the recording medium, while the intermittent "imaging" power level does cause imaging. It should be stressed that the term "imaging" refers generally to permanent alteration to the affinity characteristics of a printing plate; in preferred implementations, imaging mean ablation of a recording layer (in an ablation-type plate) or transfer of donor material to an acceptor sheet (in a transfer-type plate).

It has also been found that by selectively varying the pulse width within certain limits, it is possible to obtain image dots of different sizes while retaining a round dot shape. The degree to which dot size varies with image-pulse duration, as well as the amount of variation that can be obtained while preserving the round-dot condition, depends largely on the focal length of the final focusing lens. The minimum acceptable pulse width is generally determined by the characteristics of the recording medium, which require a threshold total energy input for response.

In use, the optical components of the invention are typically mounted in a writing head, which may contain multiple such assemblies at evenly spaced intervals. A controller causes relative movement between the writing head and a recording medium, effectively scanning the laser or lasers over the surface, activating them at positions adjacent selected points or areas of the plate. The controller indexes the writing head, after completion of each pass across or along the printing member, a distance determined by the number of beams emanating from the head and by the desired resolution (i.e, the number of image points per unit length). The pattern of laser activation is determined by image signals, provided to the controller and corresponding to the original document or picture being copied onto the plate, to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles. The components of the invention can be located on a press, in which case the imaged plates are immediately ready for printing; or on a stand-alone plate-maker (or "platesetter"), in which case the imaged plates are removed and manually transferred to a press.

The present invention is usefully applied to environments other than printing. Virtually any application requiring a high-frequency, collimated laser beam can benefit from the approach described herein. Such applications include cutting, soldering, medical therapies, etc. The invention facilitates generation of a collimated laser output that can be pulsed at frequencies up to 20 MHz or even more with minimal interference from rise and decay times.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
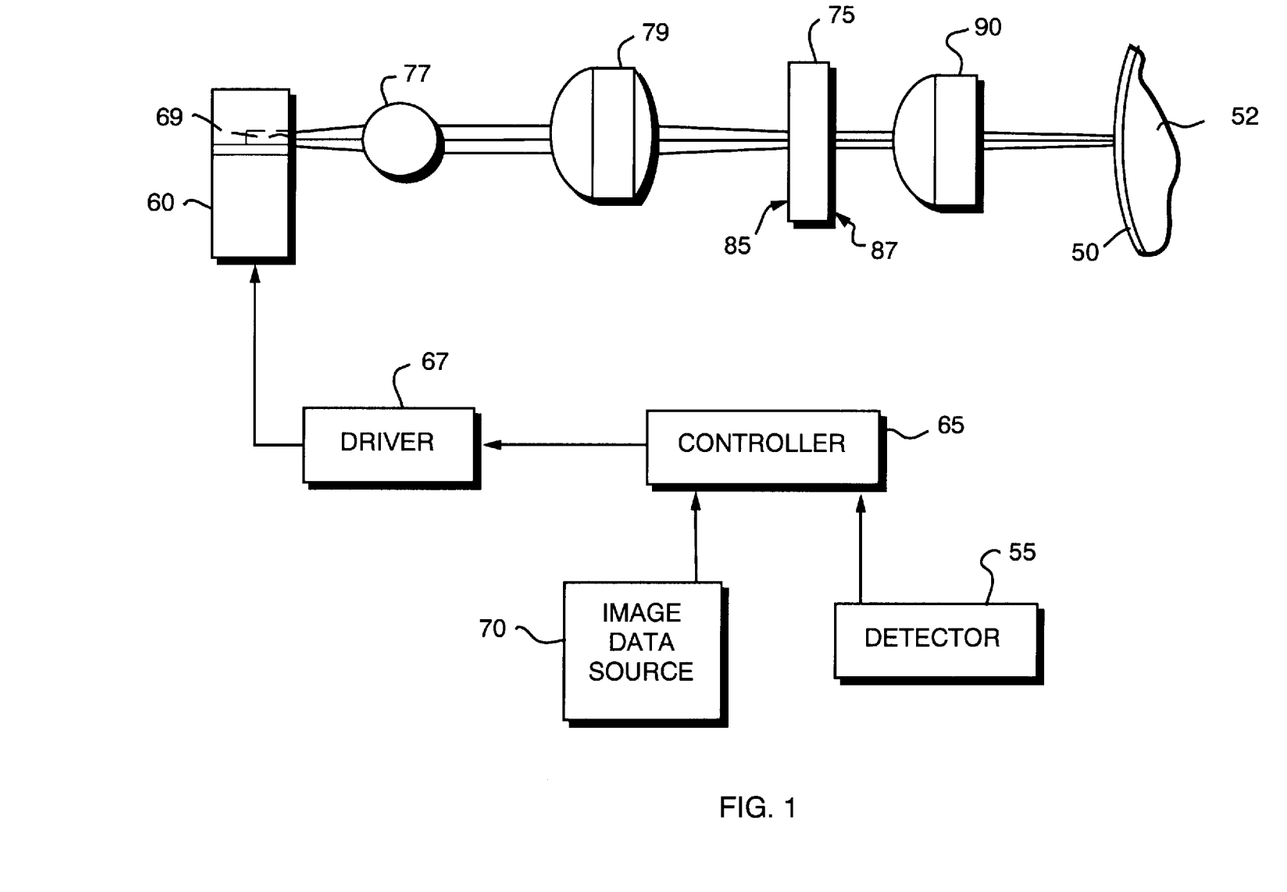
FIG. 1 schematically illustrates the basic components of the invention in a representative implementation.

Refer first to FIG. 1, which schematically illustrates the basic components of the invention. A recording medium 50, such as a lithographic plate blank or other graphic-arts construction, is affixed to a support during the imaging process. In the depicted implementation, that support is a cylinder 52, around which recording medium 50 is wrapped. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components of the invention, described hereinbelow, may be mounted in a writing head for movement on a lead screw and guide bar assembly that traverses recording medium 50 as it rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with one or more pumping laser diodes 60. The optical components discussed below concentrate the entire laser output onto recording medium 50 as a small feature, resulting in high effective power densities. A controller 65 operates a laser driver 67 (described more fully below) to produce an imaging burst when the output slit 69 of laser 60 reaches appropriate points opposite recording medium 50; at other times, however, laser 60 is maintained at the baseline, non-imaging energy level. Laser driver 67 is therefore capable of maintaining the bias power output and generating clean, high-frequency square-wave pulses (up to 20 MHz or even more) relative thereto. In particular, the driver preferably includes a pulse circuit capable of generating at least 40,000 laser-driving pulses/second, with each pulse being relatively short, i.e., on the order of microseconds.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of laser 60 and recording medium 50 (as reported by detector 55) with the image data to actuate the appropriate laser drivers at the appropriate times during scan of recording medium 50. The driver and control circuitry required to implement this scheme is well-known in the scanner and plotter art; suitable designs are described in the '092 patent and in U.S. Pat. No. 5,174,205, both commonly owned with the present application and hereby incorporated by reference.

The output of laser 60 pumps a laser crystal 75, and it is the emission of crystal 75 that actually reaches the recording medium 50. A series of lenses 77, 79 concentrate the output of laser 60 onto an end face 85 of crystal 75. Radiation disperses as it exits slit 69 of laser 60, diverging at the slit edges. Generally the dispersion (expressed as a "numerical aperture," or NA) along the short or "fast" axis shown in FIG. 1 is of primary concern; this dispersion is reduced using a divergence-reduction lens 77. A preferred configuration is a completely cylindrical lens, essentially a glass rod segment of proper diameter; however, other optical arrangements, such as lenses having hemispheric cross-sections or which correct both fast and slow axes, can also be used to advantage.

A focusing lens 79 focuses radiation emanating from lens 77 onto end face 85 of laser crystal 75. Lens 79 is preferably a bi-aspheric lens (see, e.g., U.S. Ser. No. 08/602,881, (now U.S. Pat. No. 5,764,274) filed on Feb. 16, 1996 and entitled APPARATUS FOR LASER-DISCHARGE IMAGING AND FOCUSING ELEMENTS FOR USE THEREWITH, the entire disclosure of which is hereby incorporated by reference). Generally, end faces 85, 87 have mirror coatings that limit the entry of radiation other than that originating from the pumping source, and trap the output radiation. In this way, the two coatings facilitate the internal reflections characteristic of laser amplification while preventing the entry of spurious radiation. In one embodiment, each face 85, 87 is provided with an HR coating that produces >99.8% reflection of 1064 nm (output) radiation and 95% transmission of 808 nm (input) radiation, and an R coating that produces 95% (±0.5%) reflection of 1064 nm radiation and >95% transmission of 808 nm radiation.

The highly collimated, low-NA output of crystal 75 is, finally, focused onto the surface (or an appropriate inner layer) of recording medium 50 by a lens 90, which may be a plano-convex lens (as illustrated) or other suitable optical arrangement. The laser, laser crystal and optical components are normally carried in a single elongated housing. Recording medium 50 responds to the imaging radiation emitted by crystal 75, e.g., through ablation of an imaging layer or by non-ablative transfer of material from a donor to an acceptor sheet.

The function of laser crystal 75 is to produce a low-NA laser output without excessive loss of energy from laser 60; essentially, the lost energy represents the price of increased depth-of-focus. Generally, crystal 75 is preferably (although not necessarily) a flat-flat monolith of "thermal lensing" material; optical power delivered to end face 85 causes faces 85, 87 to deflect in a bowing fashion, creating a resonator cavity that results in lasing. To create a smooth imaging spot, it is desirable to obtain a single transverse mode of operation (preferably the lowest-order, fundamental $TEM_{00}$ mode), with the output divergence as close as possible to that of a diffraction-limited source.

A variety of laser crystals can serve in the present invention so long as they lase efficiently at the desired imaging wavelength and produce a collimated output. Preferred crystals are doped with a rare earth element, generally neodymium (Nd), and include $Nd:YVO_4$, Nd:YLF and Nd:YAG crystals. It should be understood, however, that advantageous results may be obtainable with other laser crystals.

Figure 2:
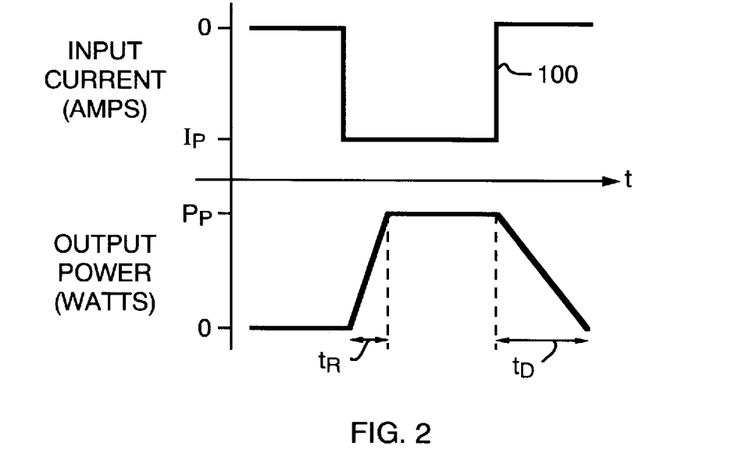
FIG. 2 shows the response of a typical laser crystal to a conventional square-wave power pulse.

The behavior of a conventionally operated laser crystal in the above-described arrangement is depicted in FIG. 2. An input pulse 100 of a given current (as illustrated, a square wave spanning 0 to a peak current level $I_P$) is applied to diode laser 60, resulting in a corresponding beam-energy output that substantially follows, in profile, the pulse 100 because of fast rise and decay times. The exit beam from laser 60, in turn, energizes crystal 75 to a peak output $P_P$. However, the reaction of laser crystal 75 is not instantaneous; peak $P_P$ is not reached until a rise time $t_R$ has passed, and output energy does not decline to zero—despite the sudden withdrawal of input energy—until after characteristic decay time $t_D$. These rise and decay times have heretofore limited the usefulness of laser crystals in digital imaging environments.

This behavior, however, can be overcome by continuously maintaining the pumping source at a bias power level that keeps the crystal producing a continuous, baseline output just short of lasing or, more desirably, lasing but just short of imaging the recording medium 50; and then selectively increasing power to diode 60 to cause crystal 75 to lase in an imagewise pattern, and at a power level sufficient to result in imaging. Good thermal management (to minimize thermal lensing) also helps to reduce rise and decay times.

Figure 3:
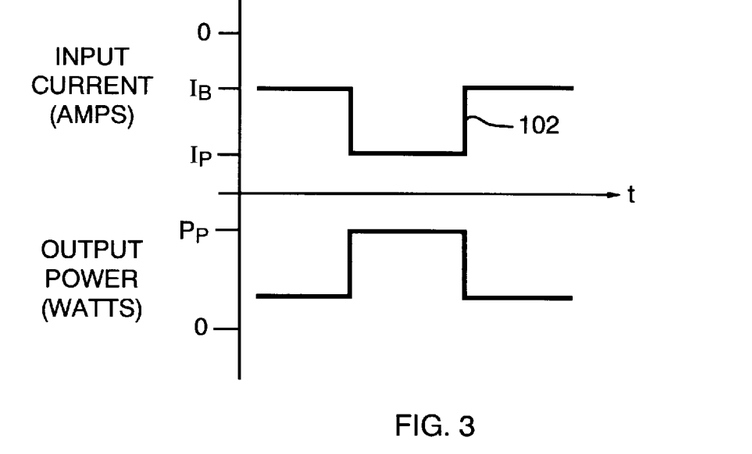
FIG. 3 shows the response of a laser crystal to a biased power pulse in accordance with the present invention.

FIG. 3 illustrates the effect using a diode laser 60 emitting at 809 nm, and a Nd:YVO$_4$ laser crystal 75 emitting at 1064 nm; biasing the diode laser at a continuous baseline input current $I_B$ (e.g., 1 A) results in a small but non-zero output from crystal 75, which rises to peak P (about 800 milliwatts) when the current to laser 60 is increased to a peak current level $I_P$ of about 2.4 A. Significantly, the rise and decay times are reduced nearly to zero, so that the output profile of crystal 75 substantially conforms to that of the power pulse 102. Lower bias power levels reduce the rise and decay times, relative to no bias, to a smaller extent; it is for this reason that a power level just short of imaging is preferred.

Figure 4:
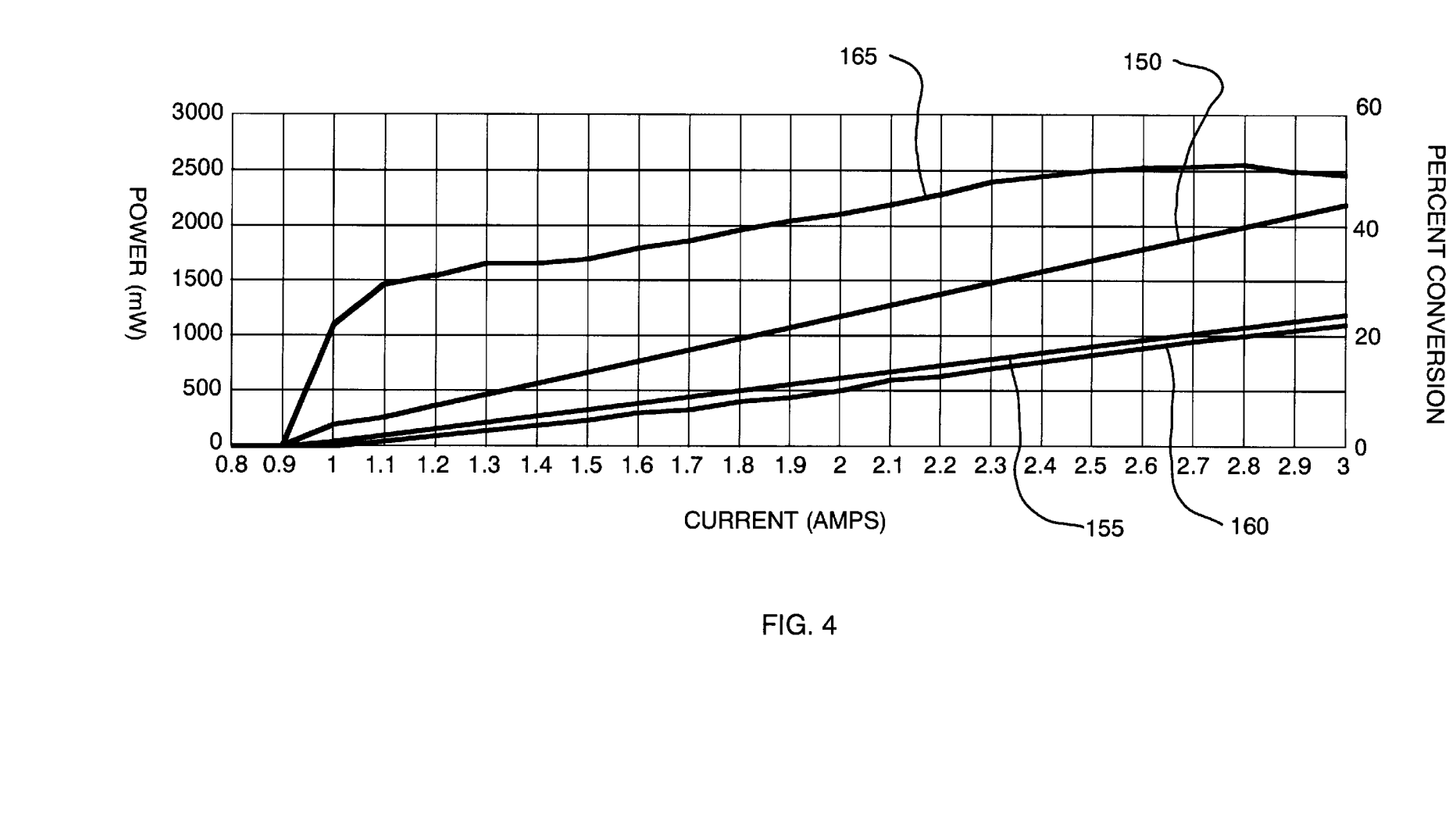
FIG. 4 graphically depicts power output at various locations along the optical chain, as well as the overall power-conversion efficiency of the system.

FIG. 4 illustrates the relationship between power levels at various points in the optical chain, as well as the efficiencies obtainable using the components and power levels discussed in connection with FIG. 3. The graph 150 shows the power output of laser 60, measured just past lens 77, as a function of increasing input current to laser 60; graph 155 shows the power out of crystal 75; and graph 160 shows the power out of lens 90. Thus, the gap between graphs 150, 155 reflects the energy loss attributable to crystal 75. The graph 165 shows the overall efficiency of energy conversion from the power output of laser 60 to the power output at recording medium 50. (Diode laser 60 generally has an intrinsic efficiency of about 50%, which is not reflected in FIG. 4.) The gap between bias and imaging power levels can, if desired, be kept quite small, e.g., about 10 milliwatts; however, as shown in the figure, this gap is preferably larger (e.g., at least 500 milliwatts as measured out of crystal 75).

The arrangement in which crystal 75 is mounted and the manner in which it is operated are critical in obtaining a stable, single-mode laser output that offers the largest possible depth-of-focus. The output should be circular in nature and feature a single dominant peak. The degree to which actual output approaches the ideal of a diffraction-limited source can be quantified, and this quantity used to assess the quality of the output. In particular, the widely used M factor relates beam resolution to the ideal of a diffraction-limited source (i.e., $M^2=1$). It is defined as follows:

$$M^2 = \frac{\Theta D_0 \pi}{4 w_B}$$

where $\Theta$ is the beam divergence, $D_0$ is the beam diameter and $w_B$ is the beam wavelength. However, the $M^2$ factor can be more conveniently measured for the present invention by utilizing an alternative definition:

$$M^2 = \frac{\pi D_{min}^2}{4 w_B z_R}$$

where $D_{min}$ is the minimum beam diameter and $z_R$ is the Rayleigh range. These quantities can be obtained by sampling through the beam to locate and determine $D_{min}$, and then translating the scan head in each direction away from $D_{min}$ until the beam size increases to 1.414 $D_{min}$; the distance between either of these points and the location of $D_{min}$ corresponds to $Z_R$.

The present invention preferably operates in the range $1 \leq M^2 \leq 3$.

Figure 5:
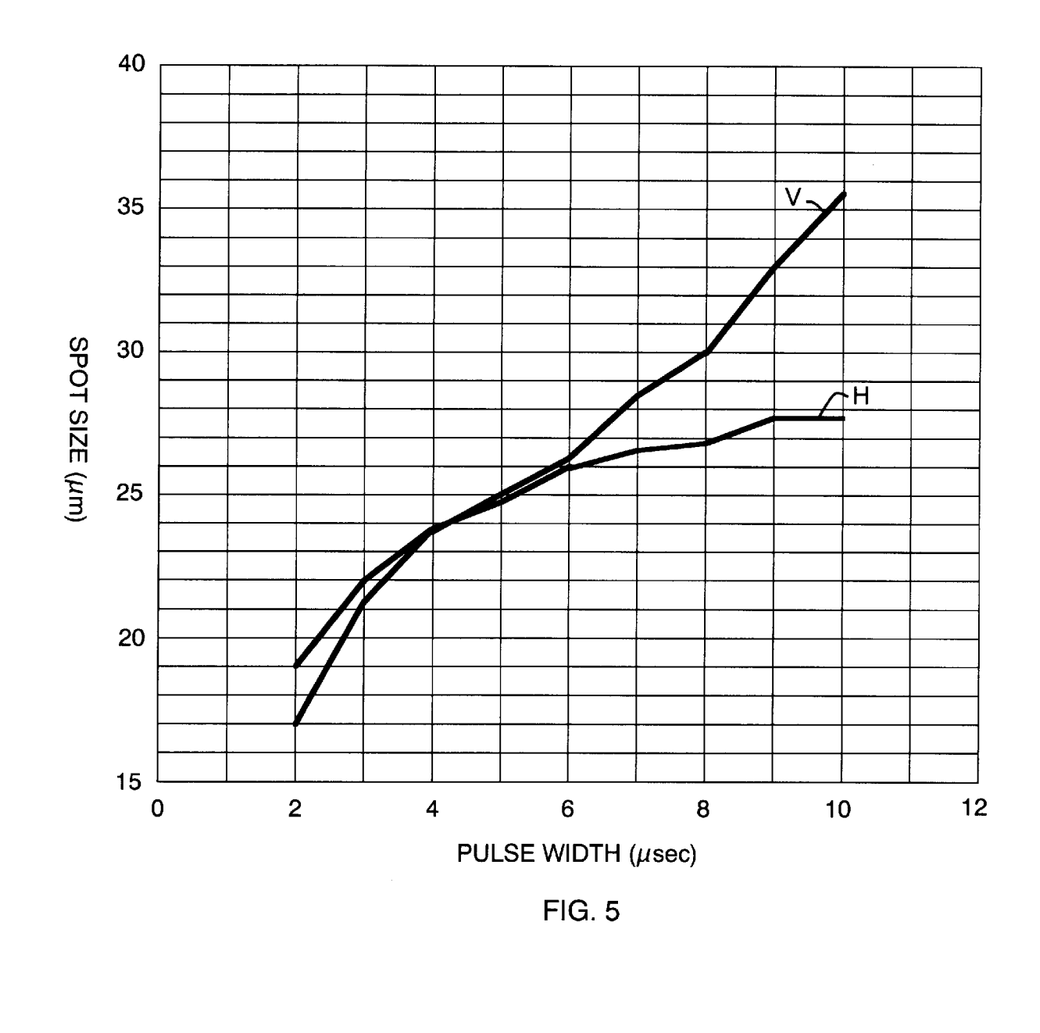
FIG. 5 graphically depicts the variation in imaging spot size with pulse width, using a 13.5 mm focusing lens.

It has also been found that, with an adequately circular beam output, varying the duration of the driver pulse produces spots of different sizes; the key variables defining the useful size range are the focal length of lens 90, the minimum necessary power density to achieve imaging (which imposes a minimum pulse duration) and the tendency of image spots to depart from roundness as the pulse width increases. FIG. 5 shows the effect on spot size of pulse widths varying from 2 to 10 μsec using a 13.5 mm lens; the pulses themselves are square waves between a 1 A baseline and a 2.5 A peak. Specifically, the graphs plot both the horizontal (graph H) and vertical (graph V) components of the resulting image spot. These components are essentially equal—that is, the spot is perfectly round—from about 4 to about 6 psec. Some deviation from perfect roundness is, however, acceptable in most practical printing environments. In particular, typical printing inks applied from an oblong printing spot will nonetheless assume a round shape so long as the horizontal and vertical axes of the spot do not diverge by more than 4 μm. According to this criterion, then, the maximum useful pulse width is about 8.5 μsec, corresponding to a spot size of about 29 μm in diameter.

Figure 6:
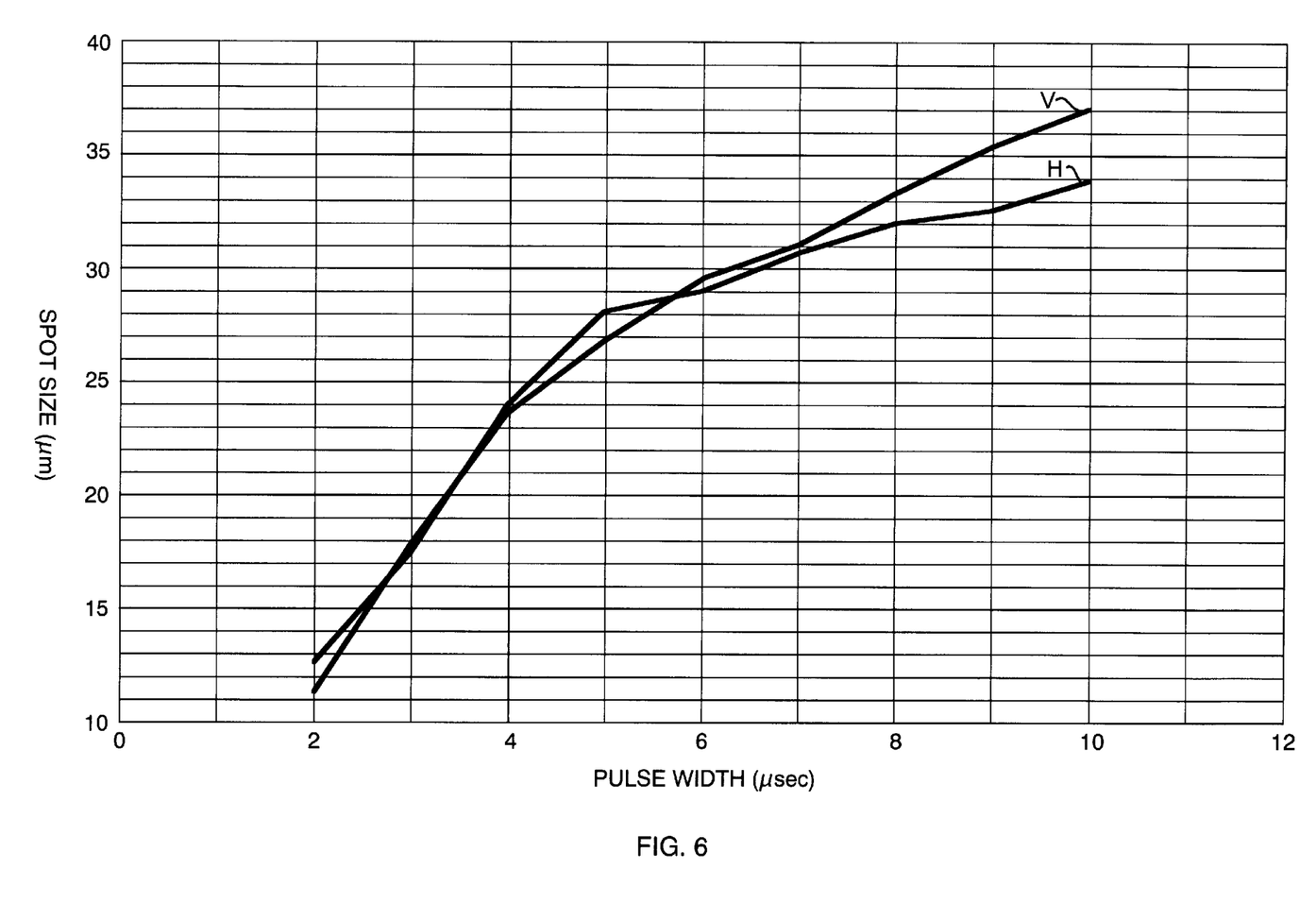
FIG. 6 graphically depicts the variation in imaging spot size with pulse width, using a 18 mm focusing lens.

FIG. 6 illustrates the variation using an 18 mm focusing lens. Because this lens produces greater depth-of-focus, the range of obtainable spot sizes is substantially increased, due both to greater latitude in varying pulse width and the more pronounced relationship between pulse width and spot size. In particular, pulse widths from 2 to 10 μsec produce acceptably round spots ranging from 12 to 35 μm in diameter.

Figure 7:
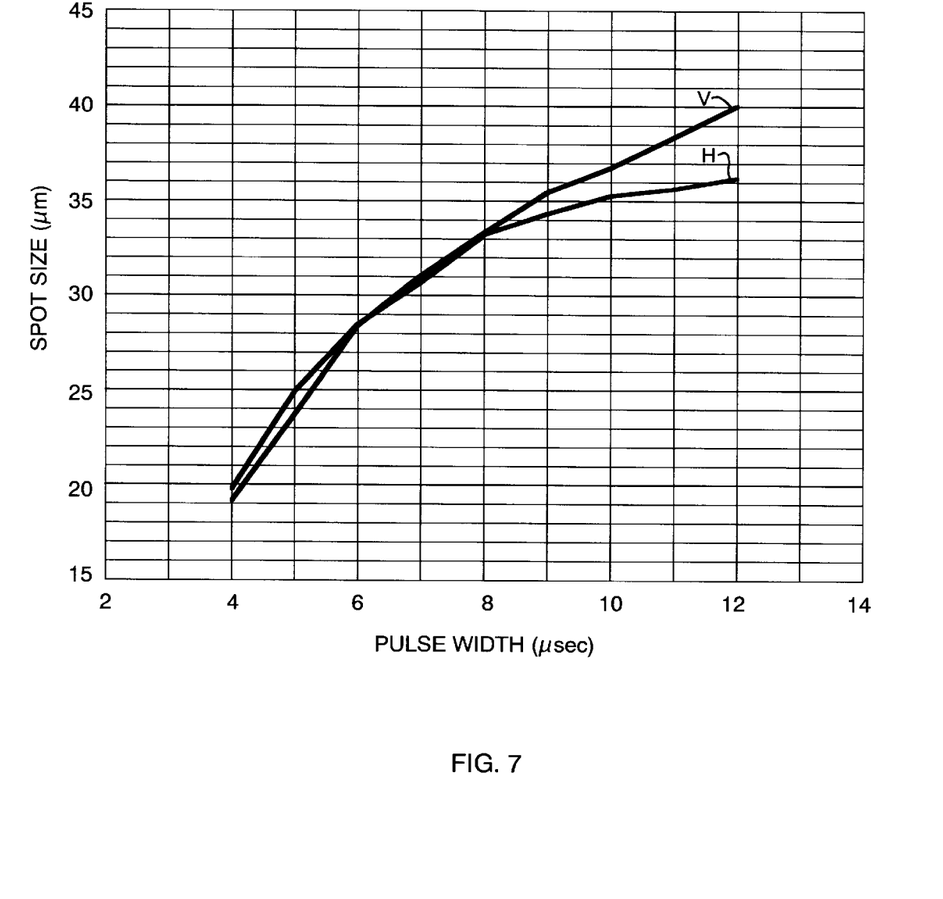
FIG. 7 graphically depicts the variation in imaging spot size with pulse width, using a 22 mm focusing lens.

In FIG. 7, a focal length of 22 mm is employed, producing even greater depth-of-focus. In this case, minimum power-density requirements limit the smallest pulse duration to about 4 μsec (corresponding to a spot size of about 19 μm), but a pulse of 12 μsec produces an acceptably round spot of about 38 μm.

Figure 8:
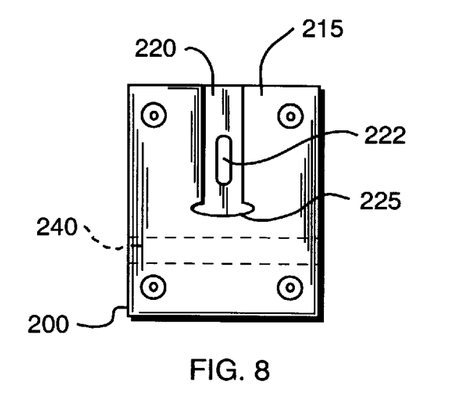
FIG. 8 is an elevational view of the inner face of one side of a suitable carrier for a laser crystal operated in accordance with the present invention.
Figure 9:
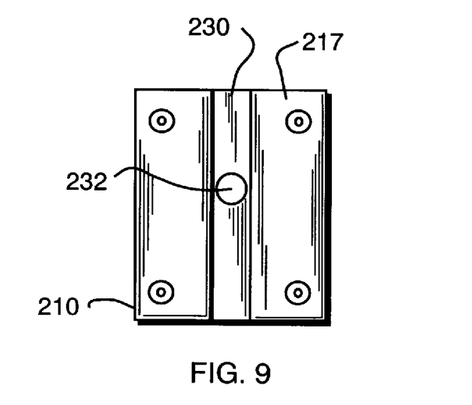
FIG. 9 is an elevational view of the inner face of the opposite side of a suitable carrier for a laser crystal operated in accordance with the present invention.
Figure 10:
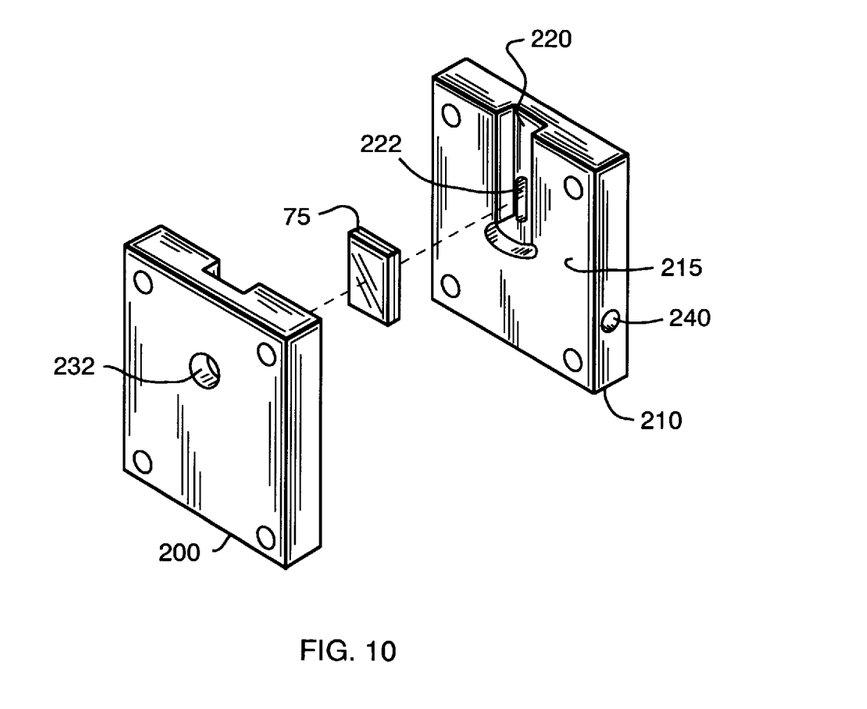
FIG. 10 is an exploded view of the carrier whose members are depicted in FIGS. 8 and 9.

A suitable carrier for crystal 75 is shown in FIGS. 8–10. The carrier comprises first and second mating members 200, 210, the inner (abutting) faces 215, 217 appearing in FIGS. 8 and 9, respectively. Member 200 comprises a recessed channel 220 that terminates below an aperture 222 to form a support shelf 225. Member 210 comprises a recess 230 and an aperture 232 therethrough. When members 200, 210 are mated as shown in FIG. 10, with face 215 butted against face 217, recesses 220, 230 form a cavity that receives crystal 75, which rests on shelf 225. Aperture 222 aligns with aperture 232 to form a continuous open light path through members 200, 210. The members can be secured together by various means, such as by bolting through opposed mounting holes at the corners as illustrated. Laser radiation from pumping source 60 enters aperture 232 and passes through crystal 75; output radiation from the exit face of crystal 75 exits the carrier through aperture 222.

Crystal 75 is polarized in the direction of the short axis shown in FIG. 1. The crystal is free to grow within the cavity formed by recesses 220, 230 along the plane of polarization, but growth is constrained along both other dimensions by the side walls and depth of the cavity. The purpose of this configuration is to control thermal lensing and limit crystal bulging in order to minimize upper-state lifetime (i.e., $t_D$). Thermal lensing is further minimized by fabricating members 200, 210 of a thermally conductive material, such as copper or other metal, and providing means for withdrawing heat to maintain a constant, desired operating temperature. For example, a conduit 240, which extends across and within member 210, may be included, and a cooling fluid (e.g., water) is passed therethrough during operation. Alternatively, the entire mount can be housed in a larger structure configured to withdraw heat.

Crystal 75 is desirably maintained at temperatures ranging from 23° to 28° C. It should be noted that the output wavelength from laser 60 tends to vary somewhat with operating temperature; this can affect performance, since the most stable output mode and greatest output power occur at a specific wavelength. However, rather than maintaining rigorous feedback control of operating temperature, it is simpler to exploit the fact that the output wavelength of laser 60 varies somewhat with input current; accordingly, compensation for temperature-induced drifts in the observed output of crystal 75 can be achieved by adjusting the current into laser 60, thereby varying its output and, therefore, the input wavelength into crystal 75.

It should also be noted that the high pulse rates obtainable with the present invention are to some extent related to the size of the spot focused onto end face 85 of crystal 75. While we have obtained good results with a spot size of about 100 $\mu$m, substantially larger spots can increase the time required for formation of a resonant cavity within crystal 75, reducing response efficiency (i.e., increasing $t_D$).

Figure 11:
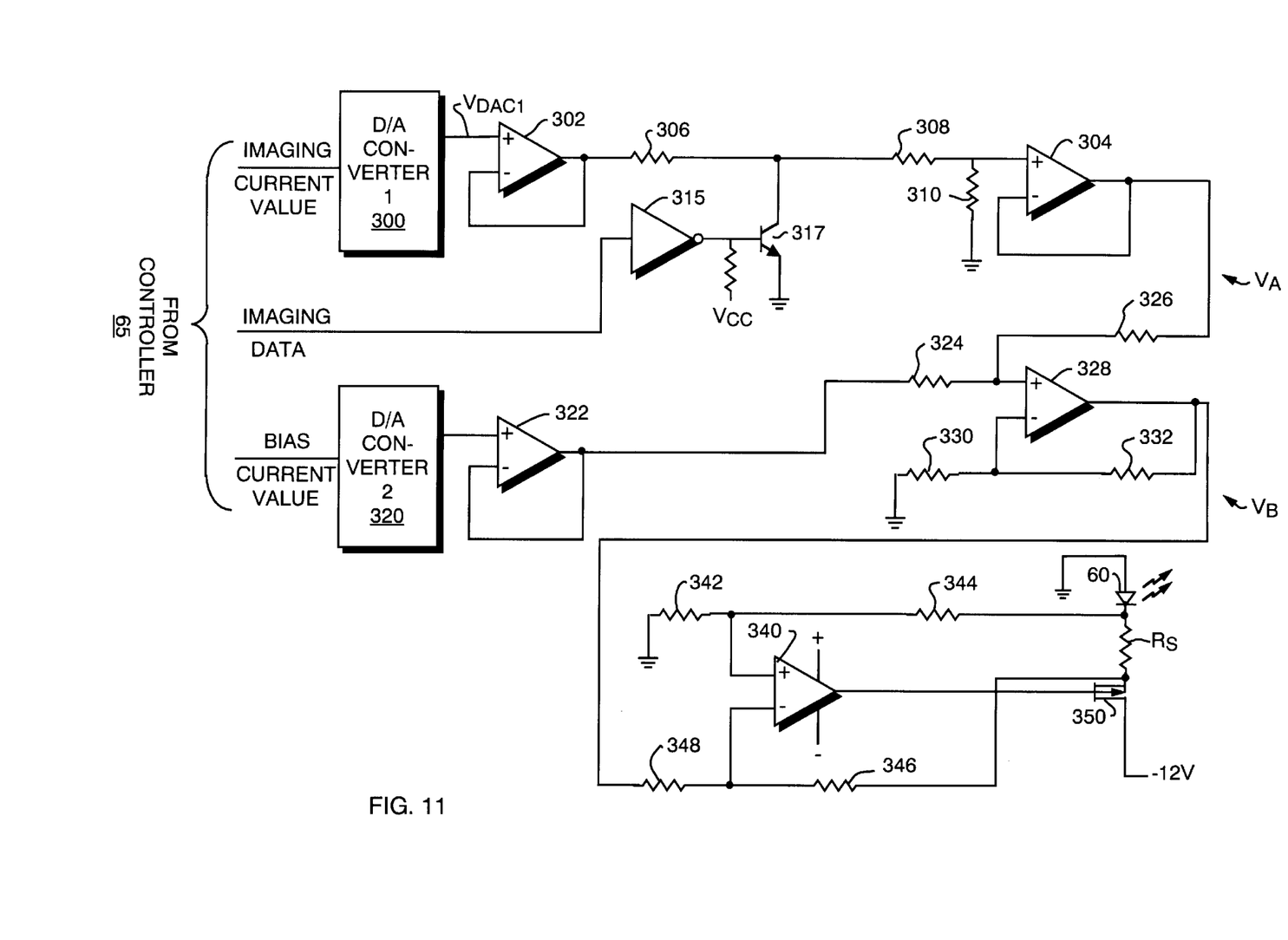
FIG. 11 is a schematic diagram of a suitable laser drive circuit for use with the present invention.
Figure 12:
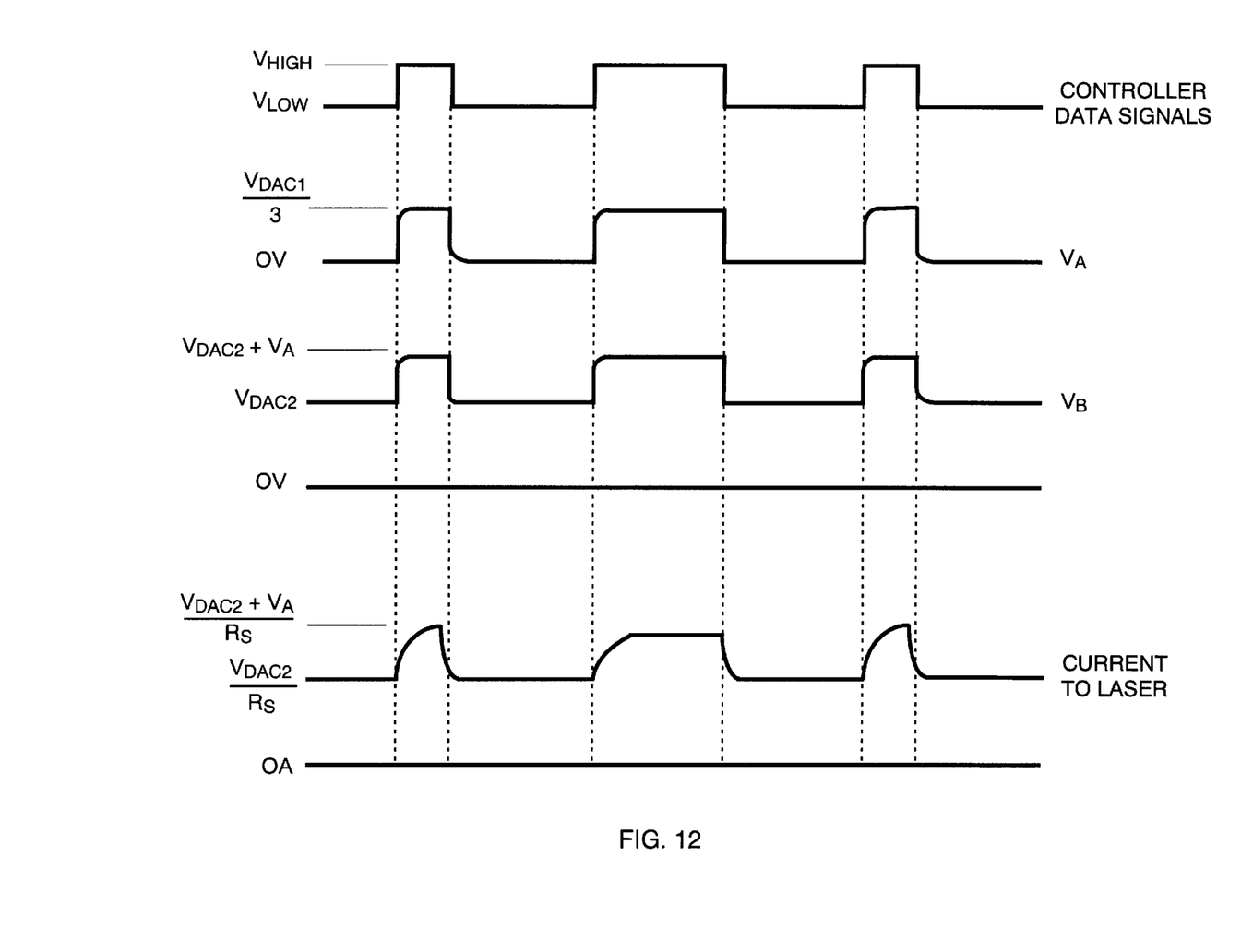
FIG. 12 shows the timewise relationship between various voltage and current levels in the circuit depicted in FIG. 11.

Turn now to FIGS. 11 and 12, which illustrate the components and operation of a suitable drive circuit for laser 60. The circuit accepts three digital inputs from controller 65: a value specifying the imaging current level to laser 60; a value specifying the bias current level; and the imaging data signals themselves. Accordingly, each of these values may be adjusted to suit particular imaging applications.

A first digital-to-analog (D/A) converter 300 receives the digitally specified imaging current level and generates a voltage $V_{DAC1}$ proportional thereto. The output of D/A converter 300 is connected to the non-inverting input terminal of an operational amplifier 302, which serves as a buffer, producing a low-impendance output voltage equal to that of the high-impedance D/A converter 300. The output of amplifier 302 is provided to the inverting terminal of a second operational amplifier 304 via a set of resistors 306, 308, 310 (each of which may have a value of, e.g., 10 k$\Omega$). The output of amplifier, $V_A$, is used to drive laser 60 to an imaging output level.

Imaging data from controller 65 is provided to a low-impedance inverter 315, the output of which is connected to the base terminal of a high-speed switching transistor 317; the collector terminal of transistor 317 is connected to the path from the output of amplifier 302 to the input of amplifier 304. As shown in FIG. 12, the data imaging signals from controller 65 take the form of square-wave pulses that alternate in voltage between a characteristic low (e.g., 0 V) that specifies a binary "zero" or "off" state to a characteristic high (e.g., 5 V), which specifies a binary "one" or "on" state. As illsutrated in FIG. 12, when the imaging data signal goes high, the output of inverter 315 is low, and the voltage at the collector terminal of transistor 317 is approximately $V_{DAC1}/3$; $V_A$, therefore, is also approximately $V_{DAC1}/3$. When the imaging data signal goes low, the voltage at the collector terminal of transistor 317 is about 0 V, so the input to amplifier 304 and, consequently, its output, $V_A$, are about 0 V. Thus, transistor 317 commutates the voltage $V_{DAC1}$ according to whether the imaging data signal is high or low, and its response speed is sufficiently high to change state in less than 200 nsec.

A second D/A converter 320 receives the digitally specified bias current value and generates a voltage $V_{DAC2}$ proportional thereto. The output of D/A converter 320 is connected to the non-inverting input terminal of another operational amplifier 322 used as a buffer. The output of amplifier 322 ($V_{DAC2}$) is combined with the output of amplifier 304 ($V_A$), via a pair of resistors 324, 326 (each of which may have a value of, e.g., 10 k$\Omega$) at the non-inverting input terminal of an operational amplifier 328, configured, by means of a pair of resistors 330, 332 (each of which may have a value of, e.g., 10 k$\Omega$), to act as a summing amplifier. The output of amplifier 328, $V_B$, which is equal to $V_{DAC2}+V_A$, is connected to the inverting input terminal of a high-speed operational amplifier 340 configured as a voltage-to-current converter by means of a precision four-resistor network comprising resistors 342, 344, 346, 348 (each of which may have a value of, e.g., 10 k$\Omega$), a field-effect transistor (FET) 350 and a low-inductance current-sensing resistor $R_S$ (which may have a value of, e.g., 1$\Omega$). These components preferably cooperate to convert an input voltage to current at a ratio of 1 amp/volt, and exhibit a signal profile as shown in FIG. 12. The radiation output of laser diode 60 is essentially directly proportional to the current through the diode, so that the voltage-to-current converter facilitates accurate and largely linear control of diode output through the bias and imaging current values.

It will therefore be seen that we have developed systems and methods for high-frequency, collimated laser beams useful in a variety of applications such as digital imaging. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the laser source can be attached directly to assembly 200, irradiating directly without transmission through fiberoptic cabling.

What is claimed is:

1. Apparatus for imaging a laser-responsive recording construction, the apparatus comprising:

a. a radiation pumping source;

b. a laser crystal, responsive to the pumping source, for producing low-dispersion radiation;

c. means for focusing the radiation from the crystal onto a recording surface;

d. a power supply coupled to the pumping source; and e. control means for controlling the power supply so as to produce, on the recording construction, an imagewise pattern, the control means being configured to (i) continuously maintain the pumping source at a bias power level, the bias power level producing a crystal laser output insufficient to image the recording construction, and (ii) in an imagewise pattern, intermittently pulse the pumping source to an imaging power level so as to produce a crystal laser output sufficient to image the recording construction.

2. The apparatus of claim 1 wherein the bias power level is sufficient to create thermal lensing and thereby produce a resonator cavity within the crystal.

3. The apparatus of claim 1 wherein the imaging power level exceeds the bias power level by at least 10 milliwatts.

4. The apparatus of claim 1 further comprising means for focusing radiation from the pumping source onto the crystal, said means comprising a cylindrical lens and a bi-aspheric lens.

5. The apparatus of claim 1 wherein, when pumped at the imaging power level, the crystal has an output mode of $TEM_{00}$ and an $M^2$ factor no greater than 3.

6. The apparatus of claim 1 wherein the crystal is selected from the group consisting of $Nd:YVO_4$, Nd:YLF and Nd:YAG.

7. The apparatus of claim 6 wherein:
   a. the control means is configured to (i) continuously maintain the pumping source at a bias power level, the bias power level producing a crystal laser output insufficient to image the recording construction, and (ii) in an imagewise pattern, intermittently pulse the pumping source to an imaging power level so as to produce a crystal laser output sufficient to image the recording construction; and
   b. the crystal is $Nd:YVO_4$.

8. The apparatus of claim 7 further comprising:
   a. a mount for containing the laser crystal, the mount being configured to allow longitudinal crystal growth but constrain lateral crystal growth; and
   b. means for conducting heat from the crystal so as to limit thermal lensing.

9. The apparatus of claim 1 further comprising a mount for containing the laser crystal, the mount being configured to allow longitudinal crystal growth but constrain lateral crystal growth.

10. The apparatus of claim 9 further comprising means for conducting heat from the crystal so as to limit thermal lensing.

11. The apparatus of claim 1 wherein:
    a. each pulse to the imaging power level has a duration and produces an image spot on the recording construction, each spot having a size determined by the pulse duration; and
    b. the control means is further configured to alter the spot size by varying the pulse durations.

12. The apparatus of claim 1 wherein the pumping source is controlled to pump at a frequency ranging from 0 to 20 MHz.

13. The apparatus of claim 1 wherein the recording construction is a printing plate having a laser-ablatable layer.

14. The apparatus of claim 1 wherein the recording construction is a printing plate having a thermal-transfer layer.

15. Apparatus for producing a high-frequency, collimated laser output, the apparatus comprising:
    a. a radiation pumping source;
    b. a laser crystal, responsive to the pumping source, for producing low-dispersion radiation, the radiation being emitted at power levels exhibiting rise and decay times;
    c. a power supply coupled to the pumping source; and
    d. control means for controlling the power supply, the control means being configured to (i) continuously maintain the pumping source at a first power level, and (ii) intermittently pulse the pumping source at high frequency to a second power level greater than the first power level, at least the second power level causing the crystal to lase, the first power level being chosen to limit the rise and decay times.

16. The apparatus of claim 15 further comprising a mount for containing the laser crystal, the mount being configured to (i) allow longitudinal crystal growth but constrain lateral crystal growth.

17. The apparatus of claim 16 further comprising means for conducting heat from the crystal so as to limit thermal lensing.

18. A method of producing a high-frequency, collimated laser output, the method comprising:
    a. providing a laser crystal for producing low-dispersion radiation, the radiation being emitted at power levels exhibiting rise and decay times;
    b. continuously maintaining the radiation at a first power level; and
    c. optically pumping, at high frequency, the laser crystal to produce a collimated crystal laser output at high frequency to a second power level greater than the first power level, at least the second power level causing the crystal to lase, the first power level being chosen to limit the rise and decay times.

19. A method of imaging a laser-responsive recording construction, the method comprising:
    a. providing a laser crystal for producing low-dispersion radiation;
    b. optically pumping, in an imagewise pattern, the laser crystal to produce the radiation; and
    c. focusing the radiation from the crystal onto a recording surface.

20. The method of claim 19 wherein the optical-pumping step comprises:
    a. continuously maintaining the radiation at a bias power level, the bias power level being insufficient to image the recording construction; and
    b. intermittently pulsing, in an imagewise pattern, the laser crystal to produce a crystal laser output sufficient to image the recording construction.

21. The method of claim 20 wherein the bias power level is sufficient to create thermal lensing and thereby produce a resonator cavity within the crystal.

22. The method of claim 20 wherein the imaging power level exceeds the bias power level by at least 10 milliwatts.

23. The method of claim 20 wherein, when pumped at the imaging power level, the crystal has an output mode of $TEM_{00}$ and an $M^2$ factor no greater than 3.

24. The method of claim 20 wherein each pulse to the imaging power level has a duration and produces an image spot on the recording construction, each spot having a size determined by the pulse duration, and further comprising the step of altering the spot size by varying the pulse durations.

25. The method of claim 19 wherein the crystal is selected from the group consisting of $Nd:YVO_4$, Nd:YLF and Nd:YAG.

26. The method of claim 19 further comprising the step of mounting the laser crystal so as to allow longitudinal crystal growth but constrain lateral crystal growth.

27. The method of claim 26 further comprising the step of conducting heat from the crystal so as to limit thermal lensing.

* * * * *